(12) United States Patent
Kang et al.

(10) Patent No.: US 10,542,513 B2
(45) Date of Patent: Jan. 21, 2020

(54) DEREGISTRATION METHOD OF USER EQUIPMENT IN NETWORK AND USER EQUIPMENT PERFORMING THE SAME

(71) Applicant: ELECTRONICS AND TELECOMMUNICATIONS RESEARCH INSTITUTE, Daejeon (KR)

(72) Inventors: Yoo Hwa Kang, Daejeon (KR); Dongmyoung Kim, Sejong-si (KR); No Ik Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/195,210

(22) Filed: Nov. 19, 2018

(65) Prior Publication Data

US 2019/0159158 A1    May 23, 2019

(30) Foreign Application Priority Data

Nov. 21, 2017  (KR) .................. 10-2017-0155913
Oct. 15, 2018   (KR) .................. 10-2018-0122804

(51) Int. Cl.
*H04W 4/00*    (2018.01)
*H04W 60/06*   (2009.01)
*H04W 60/00*   (2009.01)

(52) U.S. Cl.
CPC ......... *H04W 60/06* (2013.01); *H04W 60/005* (2013.01)

(58) Field of Classification Search
CPC ........................... H04W 60/06; H04W 60/005

USPC ........................... 455/435.1; 370/338
See application file for complete search history.

(56) References Cited

U.S. PATENT DOCUMENTS

| | | | |
|---|---|---|---|
| 8,638,750 B2 | 1/2014 | Wu et al. | |
| 9,736,725 B2 | 8/2017 | Kuo et al. | |
| 2009/0279515 A1 | 11/2009 | Cheon et al. | |
| 2014/0098791 A1 | 4/2014 | Wu et al. | |
| 2015/0016418 A1 | 1/2015 | Thiebaut et al. | |
| 2017/0295529 A1 | 10/2017 | Kang et al. | |
| 2019/0028961 A1* | 1/2019 | Faccin | H04W 4/70 |

FOREIGN PATENT DOCUMENTS

| KR | 10-1044685 B1 | 6/2011 |
|---|---|---|
| KR | 101715316 B1 | 3/2017 |
| WO | WO-2018-038412 A1 | 3/2018 |

OTHER PUBLICATIONS

S2-178704, "Removing Editor's note in section 4.12.3 Deregistration procedure for untrusted non-3GPP access", SA WG2 Meeting #124, Reno, USA, Nov. 27-Dec. 1, 2017.
S2-178703, "Updating 5.3.2.4 Support of a UE registered over both 3GPP and Non3GPP access", SA WG2 Meeting #124, Reno, USA, Nov. 27-Dec. 1, 2017.

* cited by examiner

Primary Examiner — Marcos Batista
(74) Attorney, Agent, or Firm — Rabin & Berdo, P.C.

(57) ABSTRACT

A deregistration method of user equipment in a network and user equipment performing the same is disclosed. The user equipment determines whether the user equipment is in a connection management (CM)_CONNECTED state in a non-3GPP access network and initiates a deregistration procedure through the non-3GPP access network if the user equipment is in the CM_CONNECTED state in the non-3GPP access network.

16 Claims, 4 Drawing Sheets

DEREGISTRATION METHOD OF USER EQUIPMENT IN NETWORK AND USER EQUIPMENT PERFORMING THE SAME

CROSS-REFERENCE TO RELATED APPLICATION

This application claims priority to and the benefit of Korean Patent Application Nos. 10-2017-0155913 and 10-2018-0122804 filed in the Korean Intellectual Property Office on Nov. 21, 2017 and Oct. 15, 2018, respectively, the entire contents of which are incorporated herein by reference.

BACKGROUND OF THE INVENTION

(a) Field of the Invention

The present invention relates to deregistration method of user equipment in a network, and user equipment performing the same.

(b) Description of the Related Art

Recently, standardization of 5G network technology has been underway. In a 5G network, if user equipment is already registered, a deregistration procedure according to the state of the user equipment is required.

The existing method for deregistering the user equipment is as follows. That is, when the user equipment registered through a 3GPP access network and a non-3GPP access network deregisters the registration, the user equipment may deregister the registration only through the 3GPP access network. Such an existing method requires an additional procedure for changing the 3GPP access network to a connection management_connected (CM_CONNECTED) state before the user equipment deregisters the registration if the 3GPP access network is in the idle state.

SUMMARY OF THE INVENTION

The present invention has been made in an effort to provide a deregistration method of user equipment without any additional procedure.

According to an exemplary embodiment of the present invention, a method for deregistering by user equipment (UE) in a network is provided. The method may include determining whether the UE is in a connection management (CM)_CONNECTED state in a non-3GPP access network, and initiating a deregistration procedure through the non-3GPP access network if the UE is in the CM_CONNECTED state in the non-3GPP access network.

The method may further include determining whether the UE is in a CM_IDLE state in a 3GPP access network, and the initiating may include initiating the deregistration procedure through the non-3GPP access network if the UE is in the CM_CONNECTED state in the non-3GPP access network and in the CM_IDLE state in the 3GPP access network.

The initiating may include transmitting a deregistration request message to an access and mobility management function (AMF) through the non-3GPP access network.

The deregistration request message may include an access-type field indicating an access type to be deregistered.

The access-type field may include information on the 3GPP access network, the non-3GPP access network, or the 3GPP access network and the non-3GPP access network.

The UE is registered on the 3GPP access network and the non-3GPP access network.

The method may further include transmitting, by the AMF, a packet data unit (PDU) session release request message to a session management function (SMF), and receiving, by the AMF, a PDU session release response message from the SMF.

The method may further include receiving a deregistration accept message from the AMF through the non-3GPP access network, and releasing a signaling connection with the non-3GPP access network and the AMF.

According to another exemplary embodiment of the present invention, a deregistration method of user equipment (UE) is provided. The deregistration method may include determining whether the UE is registered on both a non-3GPP access network and a 3GPP access network, determining whether the UE is in a connection management (CM)_IDLE state in the 3GPP access network and a CM_CONNECTED state in the non-3GPP access network, and initiating a deregistration procedure through the non-3GPP access network if the UE is registered on the non-3GPP access network and the 3GPP access network and the UE is in the CM_IDLE state in the 3GPP access network and in the CM_CONNECTED state in the non-3GPP access network.

The initiating may include initiating the deregistration procedure through the non-3GPP access network to deregister the UE in the 3GPP.

The initiating may include transmitting a deregistration request message to an access and mobility management function (AMF) through the non-3GPP access network.

The deregistration request message may include a field indicating the 3GPP access to be deregistered.

According to another exemplary embodiment of the present invention, user equipment (UE) performing deregistration in the network is provided. The UE may include a processor determining whether the UE is in a connection management (CM)_CONNECTED state in a non-3GPP access network and initiating a deregistration procedure through the non-3GPP access network if the UE is in the CM_CONNECTED state in the non-3GPP access network, and a network interface transmitting a message associated with the deregistration procedure through the non-3GPP access network.

The processor may determine whether the UE is in a CM_IDLE state in a 3GPP access network and initiate the deregistration procedure through the non-3GPP access network if the UE is in the CM_CONNECTED state in the non-3GPP access network and in the CM_IDLE state in the 3GPP access network.

The UE may be registered on the 3GPP access network and the non-3GPP access network.

The processor may initiate the deregistration procedure through the non-3GPP access network to deregister the UE in the 3GPP.

The network interface may transmit a deregistration request message to an access and mobility management function (AMF) through the non-3GPP access network.

The deregistration request message may include a field indicating the 3GPP access to be deregistered.

According to the exemplary embodiment of the present invention, the UE can directly request deregistration to the non-3GPP access network in the CM_CONNECTED state, thereby preventing a signaling delay and efficiently using radio resources.

DETAILED DESCRIPTION OF THE EMBODIMENTS

Figure 1:
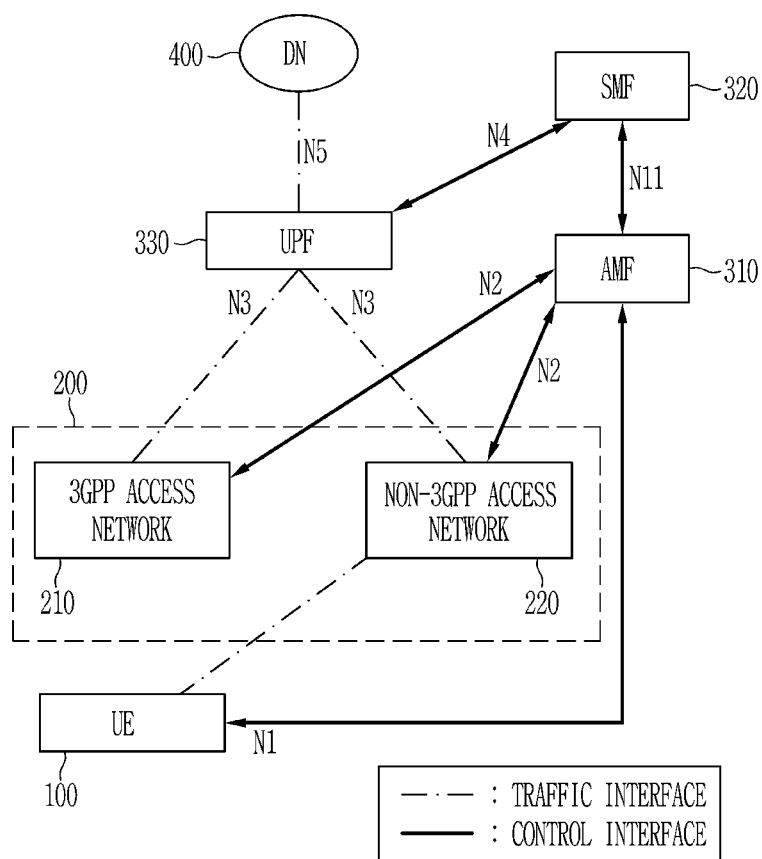
FIG. 1 is a diagram showing a 5G network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Like reference numerals designate like elements throughout the specification. Throughout the present specification, user equipment (UE) may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), or the like, and may include all or some of the functions of the terminal, the MT, the AMS, the HR-MS, the SS, the PSS, the AT, or the like.

In addition, a base station (BS) may indicate an advanced base station (ABS), a high reliability base station (HR-BS), a nodeB, an evolved nodeB (eNodeB), a base transceiver station (BTS), a mobile multihop relay (MMR)-BS, a relay station (RS) serving as a base station, a high reliability relay station (HR-RS) serving as a base station, and the like, and may include all or some of the functions of the base station, the ABS, the nodeB, the eNodeB, the BTS, the MMR-BS, the RS, the HR-RS, and the like.

FIG. 1 is a diagram showing a 5G network according to an exemplary embodiment of the present invention.

As shown in FIG. 1, a 5G network 1000 according to an exemplary embodiment of the present invention includes UE 100, an access network (AN) 200, an access and mobility management function (AMF) 310, a session management function (SMF) 320, a user plane function (UPF) 330, and a data network (DN) 400.

The UE 100 may access a network through the AN 200. The AN 200 includes a 3GPP access network 210 and a non-3GPP access network 220. The UE 100 may access a cellular mobile radio access network via the 3GPP access network 210. The UE 100 may access a wireless LAN access network via the 3GPP access network 210.

The AMF 310 and the SMF 320 are network entities that process control signals. The AMF 310 performs authentication, connection, and mobility control functions. The SMF 320 has a session control function (configuring/changing/releasing of a session), and performs a signaling procedure for traffic path configuring and traffic mobility management. That is, the SMF 320 controls a data path between the UPF 330 and the AN network 200. The AMF 310 has a non-access stratum (NAS) signal interface N1 together with the UE 100.

The UPF 330 is a network entity of a data plane that integrally accommodates the multiple access networks 210 and 220 via an N3 interface. The UPF 330 connects a data plane between the multiple access networks 210 and 220 and the DN 400 so that traffic of the UE 100 (i.e., the user) can be transmitted and received.

The UPF 330 and the access network 200 receive a routing rule for the UE 100 from the SMF 320 via an N4 or N2 interface, and perform an internet protocol (IP) routing function through the received routing rule.

As described above, the 5G network system according to an exemplary embodiment of the present invention is an integrated structure that simultaneously accommodates the 3GPP access network 210 and the non-3GPP access network 220. In such an integrated structure, a deregistration procedure of the UE 100 is required according to the state of the UE 100. In particular, when the UE 100 is in the CM (connection management)_IDLE state in the 3GPP access network 210, a deregistration procedure of the UE 100 through the non-3GPP access network 220 is required. This deregistration procedure will be described in detail with reference to FIG. 2 and FIG. 3.

Figure 2:
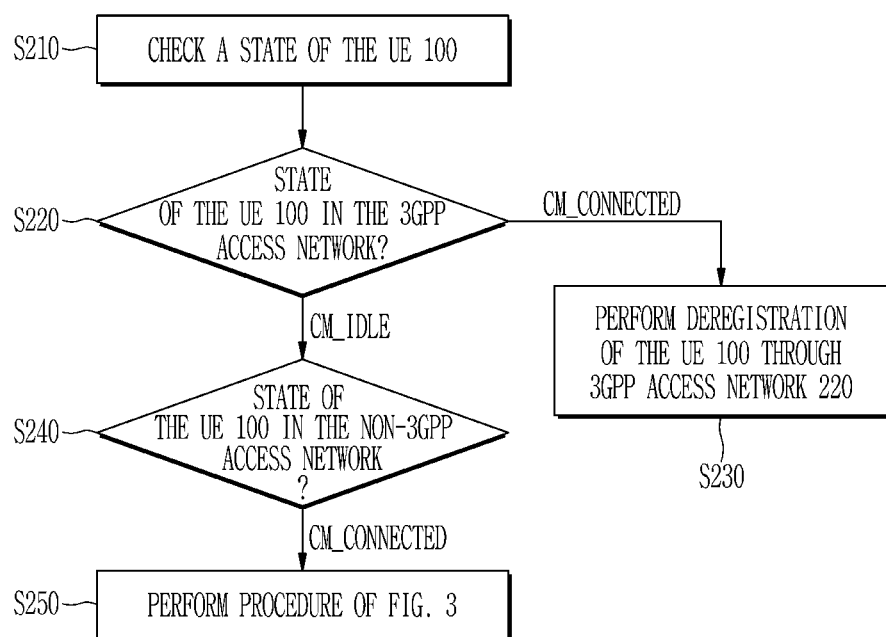
FIG. 2 is a flowchart showing a deregistration procedure of UE according to a state of the UE.

FIG. 2 is a flowchart showing a deregistration procedure of the UE 100 according to a state of the UE 100.

Referring to FIG. 2, the UE 100 checks a state of the UE in the access network (S210).

The UE 100 performs deregistration of the UE 100 through the 3GPP access network 210 when the UE 100 determines that the UE 100 is in the CM_CONNECTED state as the state of the UE 100 in the 3GPP access network 210 (S220, S230). That is, when the UE 100 is in the CM_CONNECTED state in the 3GPP access network 210, the UE 100 may transmits a deregistration request message to the AMF 310 through the 3GPP access network 210. Here, an access type included in the deregistration request message may be set to a 3GPP access network, a non-3GPP access network, or both (a 3GPP access network and a non-3GPP access network). The access type indicates the access type to be deregistered.

Figure 3:
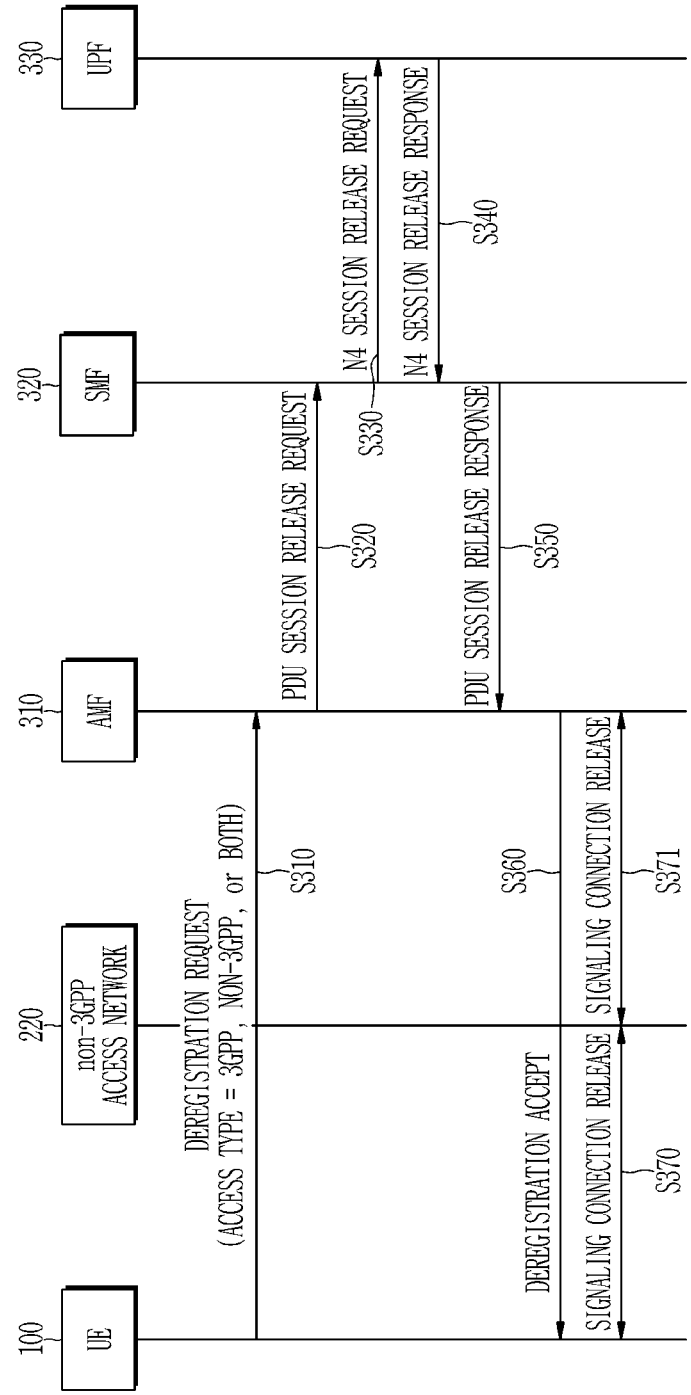
FIG. 3 is a flowchart showing a deregistration method of UE in a 5G network according to an exemplary embodiment of the present invention.

When the UE 100 determines a CM_IDLE state in the 3GPP access network 210 and a CM_CONNECTED state in the non-3GPP access network 220 as a state of the UE 100, the following procedure of FIG. 3 is performed (S220, S240, S250). That is, when the UE 100 is in the CM_CONNECTED state in the non-3GPP access network 220, the UE 100 may transmit a deregistration request message to the AMF 310 through the non-3GPP access network 220. Here, the access type included in the deregistration request message may be set to a 3GPP access network, a non-3GPP access network, or both (a 3GPP access network and a non-3GPP access network). The access type indicates the access type to be deregistered.

FIG. 3 is a flowchart showing a deregistration method of the UE 100 in a 5G network according to an exemplary embodiment of the present invention.

If the 3GPP access network 210 and the non-3GPP access network 220 are registered in the same AMF 310 and the UE 100 is in the CM_CONNECTED state in the non-3GPP access network 220 and In the CM_IDLE state in the 3GPP access network 210, the UE 100 may perform a procedure for requesting deregistration of the UE through the non-3GPP access network 220, as shown in FIG. 3. For example, when the UE 100 is registered in both the 3GPP access network 210 and the non-3GPP access network 220 and the UE 100 is in the CM_CONNECTED state in the non-3GPP access network 220 and the UE 100 is in the CM_IDLE state in the network 210, the UE 100 can initiate the deregistration procedure through the non-3GPP access network 220 to cancel the registration of the UE in the 3GPP access network 210.

First, the UE 100 transmits a deregistration request message to the AMF 310 through the non-3GPP access network 220 (S310). The deregistration request message includes an access-type field indicating an access type to be deregistered. The access type field may be set to a 3GPP access network, a non-3GPP access network, or both (a 3GPP access network and a non-3GPP access network). When the access-type field is set to the 3GPP access network, it means that a deregistration request is sent to the 3GPP access network. When the access-type field is set to the non-3GPP access network, it means that a deregistration request is sent to the non-3GPP access network. When the access type field is set to the both, it means that a deregistration request is sent to the 3GPP access network and the non-3GPP access network.

When the AMF 310 receives the deregistration request message in step S310, the AMF 310 transmits a packet data unit (PDU) session release request message to the corresponding SMF 320 in order to release a PDU session of the access network to be deregistered (S320). Here, the PDU session release request message may be an N session management function PDU Session Release Session Management Context Request (Nsmf PDUSession ReleaseSMContext Request) message.

When the SMF receives the PDU session release request message in step S320, the SMF 320 releases the PDU session corresponding to the access type to be deregistered, all related resources (e.g., IP), and related user plane resources, and transmits an N4 session release request message to the UPF 330 (S330). For example, if the access type to be deregistered is the 3GPP access network 210, the SMF 320 may release all PDU sessions associated with the 3GPP access network 210.

When receiving the N4 session release request message in step S330, the UPF 330 discards all remaining packets of the corresponding PDU session, releases all the tunnel resources and all the N4 session related information, and then transmits an N4 session release response message to the SMF 320 (S350).

When the AMF 310 receives the N4 session release response message in step S350, it transmits a deregistration accept message to the UE 100 through the non-3GPP access network 220 (S360). That is, when the deregistration procedure in the network is performed through steps S320 to S350, the AMF 310 transmits a deregistration accept message to the UE through the non-3GPP access network 220.

If the UE 100 receives the deregistration accept message from the AMF 310 in step S360, the UE 100 releases signaling connection to the corresponding deregistered access network (S370, S371). That is, the UE 100 interacts with the non-3GPP access network 220 and the AMF 310 and releases a signaling connection to the corresponding deregistered access network (e.g., a 3GPP access network, a non-3GPP access network, or a 3GPP access network and a non-3GPP access network) (S370, S371).

As described above, according to the exemplary embodiment of the present invention, when the 3GPP access network is in an idle state, there is no need for a service request procedure for changing the 3GPP access network state to the CM_CONNECTED state in order to deregister the UE. According to the exemplary embodiment of the present invention, the UE can directly request deregistration to the non-3GPP access network in the CM_CONNECTED state, thereby preventing the signaling delay and efficiently using radio resources.

Figure 4:
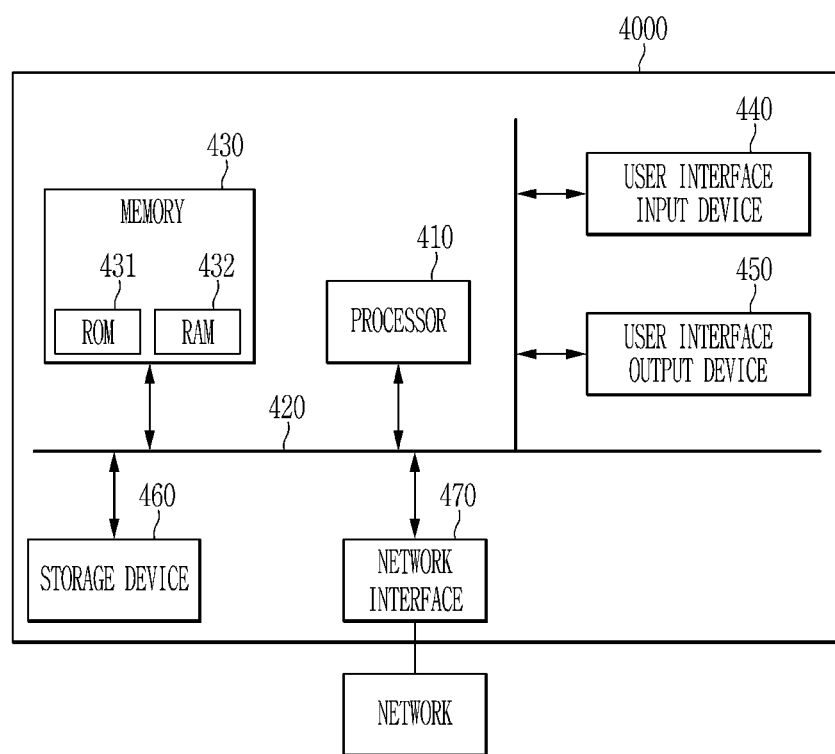
FIG. 4 is a diagram showing a computing system according to an exemplary embodiment of the present invention.

FIG. 4 is a diagram showing a computing system according to an exemplary embodiment of the present invention.

The computing in FIG. 4 may be the AMF 310, the SMF 320, or the UPF 330 of FIG. 1. The UE 100, the access network 200, the AMF 310, the SMF 320, or the UPF 330 may be implemented as a computer system, for example, a computer readable medium.

The computer system 4000 includes at least one of a processor 410, a memory 430, a user interface input device 440, a user interface output device 450, and a storage device 460, that communicate via a bus 420. The computer system 4000 may also include a network interface 470 coupled to a network. The network interface 470 may transmit or receive signals with other entities over the network.

The processor 410 may be a central processing (CPU) or a semiconductor device that executes instructions stored in the memory 430 or the storage device 460. The processor 410 may be configured to implement the functions and methods described in FIG. 1 to FIG. 3.

The memory 430 and the storage device 460 may include various forms of volatile or non-volatile storage media. For example, the memory 430 may include a read only memory (ROM) 431 and a random access memory (RAM) 432. In an exemplary embodiment of the present invention, the memory 430 may be located inside or outside the processor 410, and the memory 430 may be coupled to the processor 410 through various already-known means.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for deregistering, by user equipment (UE) in a network, the method comprising:
   determining whether the UE is in a connection management (CM)_CONNECTED state in a non-3GPP access network; and
   initiating a deregistration procedure through the non-3GPP access network if the UE is in the CM_CONNECTED state in the non-3GPP access network,
   wherein the initiating comprises transmitting a deregistration request message to an access and mobility management function (AMF) through the non-3GPP access network.

2. The method of claim 1, further comprising
   determining whether the UE is in a CM_IDLE state in a 3GPP access network,
   wherein the initiating comprises initiating the deregistration procedure through the non-3GPP access network if the UE is in the CM_CONNECTED state in the non-3GPP access network and in the CM_IDLE state in the 3GPP access network.

3. The method of claim 1, wherein
   the deregistration request message comprises an access-type field indicating an access type to be deregistered.

4. The method of claim 3, wherein
   the access-type field comprises information on the 3GPP access network, the non-3GPP access network, or the 3GPP access network and the non-3GPP access network.

5. The method of claim 2, wherein
the UE is registered on the 3GPP access network and the non-3GPP access network.

6. The method of claim 1, further comprising:
transmitting, by the AMF, a packet data unit (PDU) session release request message to a session management function (SMF); and
receiving, by the AMF, a PDU session release response message from the SMF.

7. The method of claim 6, further comprising:
receiving a deregistration accept message from the AMF through the non-3GPP access network; and
releasing a signaling connection with the non-3GPP access network and the AMF.

8. The method of claim 6, wherein
the PDU session release request message is an N session management function PDU Session Release Session Management Context Request (Nsmf PDUSession ReleaseSMContext Request) message, and the PDU session release response message is an Nsmf PDUSession ReleaseSMContext Response message.

9. A deregistration method of user equipment (UE), the method comprising:
determining whether the UE is registered on both a non-3GPP access network and a 3GPP access network;
determining whether the UE is in a connection management (CM)_IDLE state in the 3GPP access network and a CM_CONNECTED state in the non-3GPP access network; and
initiating a deregistration procedure through the non-3GPP access network if the UE is registered on the non-3GPP access network and the 3GPP access network and the UE is in the CM_IDLE state in the 3GPP access network and in the CM_CONNECTED state in the non-3GPP access network,
wherein the initiating comprises initiating the deregistration procedure through the non-3GPP access network to deregister the UE in the 3GPP access network.

10. The method of claim 9, wherein
the initiating comprises transmitting a deregistration request message to an access and mobility management function (AMF) through the non-3GPP access network.

11. The method of claim 10, wherein
the deregistration request message comprises a field indicating the 3GPP access to be deregistered.

12. User equipment (UE) performing deregistration in the network, the UE comprising:
a processor determining whether the UE is in a connection management (CM)_CONNECTED state in a non-3GPP access network and initiating a deregistration procedure through the non-3GPP access network if the UE is in the CM_CONNECTED state in the non-3GPP access network; and
a network interface transmitting a message associated with the deregistration procedure through the non-3GPP access network,
wherein the network interface transmits a deregistration request message to an access and mobility management function (AMF) through the non-3GPP access network.

13. The UE of claim 12, wherein
the processor
determines whether the UE is in a CM_IDLE state in a 3GPP access network and initiates the deregistration procedure through the non-3GPP access network if the UE is in the CM_CONNECTED state in the non-3GPP access network and in the CM_IDLE state in the 3GPP access network.

14. The UE of claim 13, wherein
the UE is registered on the 3GPP access network and the non-3GPP access network.

15. The UE of claim 13, wherein
the processor initiates the deregistration procedure through the non-3GPP access network to deregister the UE in the 3GPP access network.

16. The UE of claim 5, wherein
the deregistration request message comprises a field indicating the 3GPP access to be deregistered.

* * * * *